US012421855B2

(12) United States Patent
Rausch et al.

(10) Patent No.: US 12,421,855 B2
(45) Date of Patent: Sep. 23, 2025

(54) TURBINE ENGINE WITH A BLADE

(71) Applicant: General Electric Company, Schenectady, NY (US)

(72) Inventors: Jonathan Michael Rausch, West Chester, OH (US); Zachary Daniel Webster, Cincinnati, OH (US); Kevin Robert Feldmann, Mason, OH (US); Andrew David Perry, Cincinnati, OH (US); Kirk Douglas Gallier, Liberty Township, OH (US); Daniel Endecott Osgood, Loveland, OH (US)

(73) Assignee: General Electric Company, Evendale, OH (US)

( * ) Notice: Subject to any disclaimer, the term of this patent is extended or adjusted under 35 U.S.C. 154(b) by 4 days.

(21) Appl. No.: 18/599,470

(22) Filed: Mar. 8, 2024

(65) Prior Publication Data
US 2024/0254885 A1 Aug. 1, 2024

Related U.S. Application Data

(63) Continuation of application No. 17/836,023, filed on Jun. 9, 2022, now Pat. No. 11,927,111.

(51) Int. Cl.
F01D 5/18 (2006.01)
F01D 25/12 (2006.01)

(52) U.S. Cl.
CPC ............ F01D 5/186 (2013.01); F01D 25/12 (2013.01); F05D 2220/32 (2013.01); F05D 2240/30 (2013.01); F05D 2260/202 (2013.01)

(58) Field of Classification Search
CPC .......... F05D 2260/202; F05D 2220/32; F01D 25/12; F01D 5/186
See application file for complete search history.

(56) References Cited

U.S. PATENT DOCUMENTS

| 5,624,231 A | 4/1997 | Ohtomo et al. |
| 6,164,914 A | 12/2000 | Correia et al. |
| 6,276,897 B1 | 8/2001 | Tarada |
| 7,712,316 B2 | 5/2010 | Spangler |
| 7,997,866 B2 | 8/2011 | Naik et al. |
| 8,079,812 B2 | 12/2011 | Okita |
| 8,092,176 B2 | 1/2012 | Liang |
| 8,092,179 B2 | 1/2012 | Paauwe et al. |

(Continued)

OTHER PUBLICATIONS

ICAO Engine Exhaust Emissions Data Sheet, Subsonic Engines, ID GEnx-0B76A/P2, one page, prepared Jan. 22, 2021.

(Continued)

Primary Examiner — Courtney D Heinle
Assistant Examiner — Andrew Thanh Bui
(74) Attorney, Agent, or Firm — Hanley, Flight & Zimmerman, LLC

(57) ABSTRACT

A blade for a turbine engine with a wall separating a cooling fluid flow and a hot gas fluid flow and having a heated surface along which the hot gas fluid flow flows and a cooled surface facing the cooling fluid flow. A plurality of cooling holes each having a passage extending between an inlet at the cooled surface and an outlet at the heated surface. The outlet extending between an upstream end and a downstream end with respect to the hot gas fluid flow to define a distance, the passage defining a centerline forming a first angle (θ) with the heated surface.

20 Claims, 8 Drawing Sheets

(56) References Cited

U.S. PATENT DOCUMENTS

| | | |
|---|---|---|
| 8,328,517 B2 | 12/2012 | Liang |
| 9,103,217 B2 | 8/2015 | Giglio et al. |
| 9,188,012 B2 | 11/2015 | Lacy et al. |
| 9,228,440 B2 | 1/2016 | Kollati et al. |
| 9,494,043 B1 | 11/2016 | Lee et al. |
| 9,605,545 B2 | 3/2017 | Grohens et al. |
| 9,957,811 B2 | 5/2018 | Hucker et al. |
| 10,030,525 B2 * | 7/2018 | Bergholz ................. F01D 5/186 |
| 10,094,226 B2 * | 10/2018 | Smith ..................... F01D 5/186 |
| 10,215,030 B2 | 2/2019 | Xu |
| 10,386,069 B2 * | 8/2019 | Pearson ................... F23R 3/06 |
| 10,472,972 B2 | 11/2019 | Bunker et al. |
| 10,626,730 B2 | 4/2020 | Auxier et al. |
| 10,822,958 B2 * | 11/2020 | Wang ..................... F01D 5/186 |
| 2014/0099189 A1 | 4/2014 | Morris et al. |
| 2016/0097325 A1 | 4/2016 | Harding et al. |
| 2016/0326883 A1 | 11/2016 | Thornton et al. |
| 2017/0328214 A1 | 11/2017 | Odemondo |
| 2018/0320530 A1 | 11/2018 | Feldmann et al. |
| 2020/0190990 A1 | 6/2020 | Hohenstein |
| 2023/0399953 A1 | 12/2023 | Rausch et al. |

OTHER PUBLICATIONS

U.S. Department of Transporation, Federal Aviation Administration, TCDS No. E00077NE, Rev. 17, 22 pages, Dec. 21, 2020.

* cited by examiner

TURBINE ENGINE WITH A BLADE

CROSS-REFERENCE TO RELATED APPLICATIONS

This application claims priority to and is a continuation of U.S. patent application Ser. No. 17/836,023 filed Jun. 9, 2022, which is incorporated herein by reference in their entirety.

TECHNICAL FIELD

The present subject matter relates generally to a blade for a turbine engine, and more specifically to a blade with cooling hole and geometric features.

BACKGROUND

A gas turbine engine typically includes a turbomachine, with a fan in some implementations. The turbomachine generally includes a compressor, combustor, and turbine in serial flow arrangement. The compressor compresses air which is channeled to the combustor where it is mixed with fuel. The mixture is then ignited for generating hot combustion gases. The combustion gases are channeled to the turbine, which extracts energy from the combustion gases for powering the compressor and fan, if used, as well as for producing useful work to propel an aircraft in flight or to power a load, such as an electrical generator.

During operation of the gas turbine engine, various systems can generate a relatively large amount of heat. For example, a substantial amount of heat can be generated during operation of the thrust generating systems, lubrication systems, electric motors and/or generators, hydraulic systems or other systems. Accordingly, cooling mechanisms for the engine components therein is advantageous.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
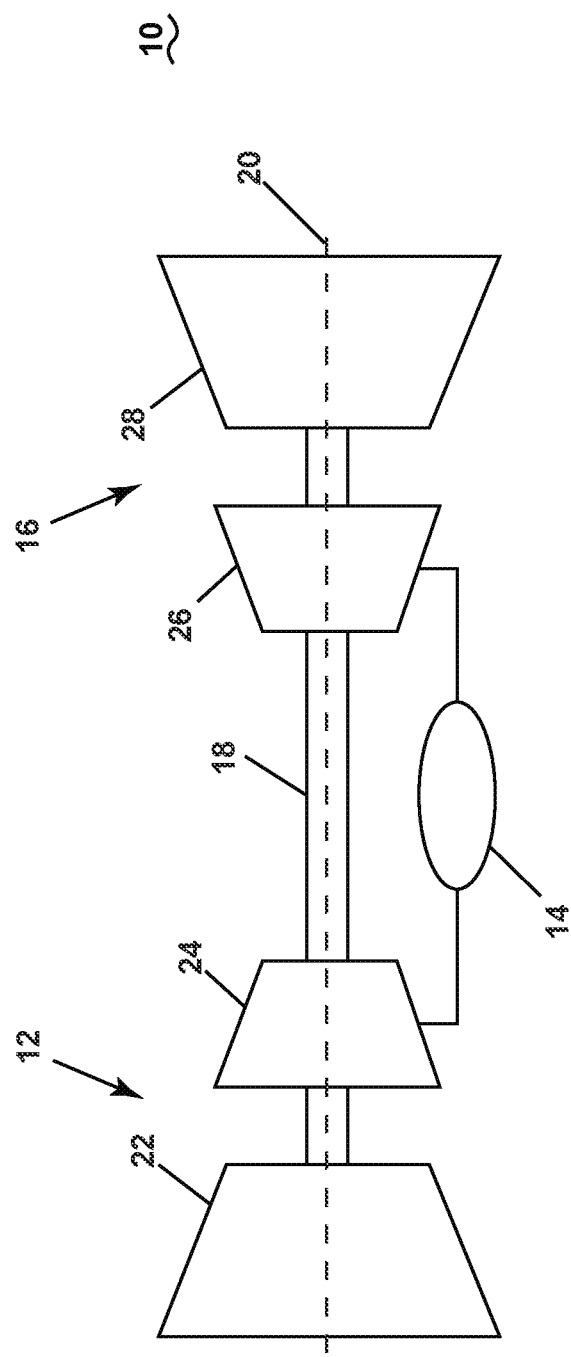
FIG. 1 is a schematic cross-sectional view of a gas turbine engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to turbine engine airfoils, including cooled turbine engine blades. Traditional blades often include film cooling over portions of the blade surface, where tip cooling arrangements are generally separated from radially-inward cooling arrangements due to design constraints. Aspects of the disclosure provide for a blade with an integrated cooling design for both tip regions and lower-span regions, providing for improved cooling performance at higher-temperature operations. Aspects of the disclosure also provide for a blade with a generally smooth or flat exterior surface, providing improved aerodynamic performance while allowing for desired cooling effectiveness in high-temperature environments.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first," "second," and "third" can be used interchangeably to distinguish one component from another and are not intended to signify location or importance of the individual components.

The terms "forward" and "aft" as may be used herein, refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

The term "fluid" can be a gas or a liquid. The term "fluid communication" means that a fluid is capable of making the connection between the areas specified.

The singular forms "a", "an", and "the" include plural references unless the context clearly dictates otherwise.

As may be used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, "flow field" refers to a distribution of at least one of a fluid density or fluid velocity in a given spatial region.

As used herein, a stage of either the compressor or turbine is a pair of an adjacent set of blades and set of vanes in a flow direction, with both sets of the blades and vanes circumferentially arranged about an engine centerline. The blades rotate relative to the engine centerline and, in one example, are mounted to a rotating structure, such as a disk, to affect the rotation. A pair of circumferentially-adjacent vanes in the set of vanes are referred to as a nozzle. The vanes, in one example, are stationary, and mounted to a casing surrounding the set of blades, and, in another example of a counter-rotating engine, are mounted to a rotating drum surrounding the set of blades. The rotation of the blades creates a flow of air through the vanes/nozzles.

As used herein, a "number of blades" (denoted "NB") is the number of blades in a stage within either the combustor or turbine of a turbine engine of an aircraft.

As used herein, a "number of nozzles" (denoted "NN") is the number of nozzles in a stage. Put another way, the number of nozzles NN in a stage will be half the number of vanes in that stage.

As may be used herein, "indicated turbine exhaust gas temperature" or "exhaust gas temperature" (denoted "EGT") refers to a maximum gas temperature in a turbine engine as measured at a location between a high-pressure turbine and a low-pressure turbine under takeoff power conditions during a 5-minute period.

As used herein, "tip radius" (denoted "TR") is the distance measured from the engine centerline to a tip of the blades when the turbine engine is off under standard day conditions, e.g. 15° C. at mean sea level altitude and 101.3 kPa atmospheric pressure, as is known in the art. Tip radius TR as used herein is also known in the art as a "cold tip radius."

As may be used herein, a "percent span," or "percent of span," e.g. 50% span, 80% span, 100% of span, or the like, refers to a location along a blade expressed in terms of a percentage of an overall span-wise length of a blade, as measured from a tip to a root. For example, "10% span" refers to a location along the blade that is spaced from the tip by 10% of the overall span-wise length of that blade. Put another way, "10% span" refers to a location along the blade that is spaced from the root by 90% of the overall span-wise length.

As used herein, "radial" or "radially" refers to a span-wise direction defined between a blade root and a blade tip. In some implementations, the span-wise direction is non-orthogonal to an engine centerline. In some implementations, the span-wise direction is orthogonal to an engine centerline.

As used herein, "blade parameter" (denoted "BP") is a value describing the smoothness of the blade along a pressure side of the blade. The blade parameter BP is a ratio between a blade surface length, or surface length (denoted "$L_{max}$") and a radial length (denoted "R") between two points lying on the blade surface. The radial length R is a straight-line/radial distance measured radially along the pressure-side surface between two locations that share a common chord-wise position. The surface length $L_{max}$ measures the length of a pressure-side surface between the same two locations as R. Put another way, R represents a distance between two points on a flat blade surface, and $L_{max}$ is a contour or length portion of the blade surface between the same two points taken over the blade surface, the length measured to include indents or protrusions on the blade surface, and excluding any cooling holes, slots, or other apertures that extend through the blade surface. When the ratio $L_{max}/R$ is equal to 1, the blade is smooth or has a flat surface. When the ratio $L_{max}/R$ is greater than 1, an indent or a protrusion exists on the blade, such as a shelf on the blade surface. The blade parameter BP describes the flatness of the blade between the two points.

As used herein, Blade Tip Durability Factor (denoted "BTDF") is a value describing a relationship between the number of blades NB, number of nozzles NN, exhaust gas temperature EGT, tip radius TR, and blade parameter BP.

As used herein a "hydraulic diameter" is in reference to the openings within the unit-cell. Hydraulic diameter is a commonly used term when handling flow in non-circular tubes and channels. When the cross-section is uniform along the tube or channel length, it is defined as $$D_H = \frac{4a}{p}$$

where "a" is the cross-sectional area of the flow and "p" is the wetted perimeter of the cross-section.

A straight-line length referred to herein as distance (denoted "d" with various subscripts) is a length measured along a straight-line between a downstream end and an upstream end of the referenced cooling hole outlets.

Figure 5:
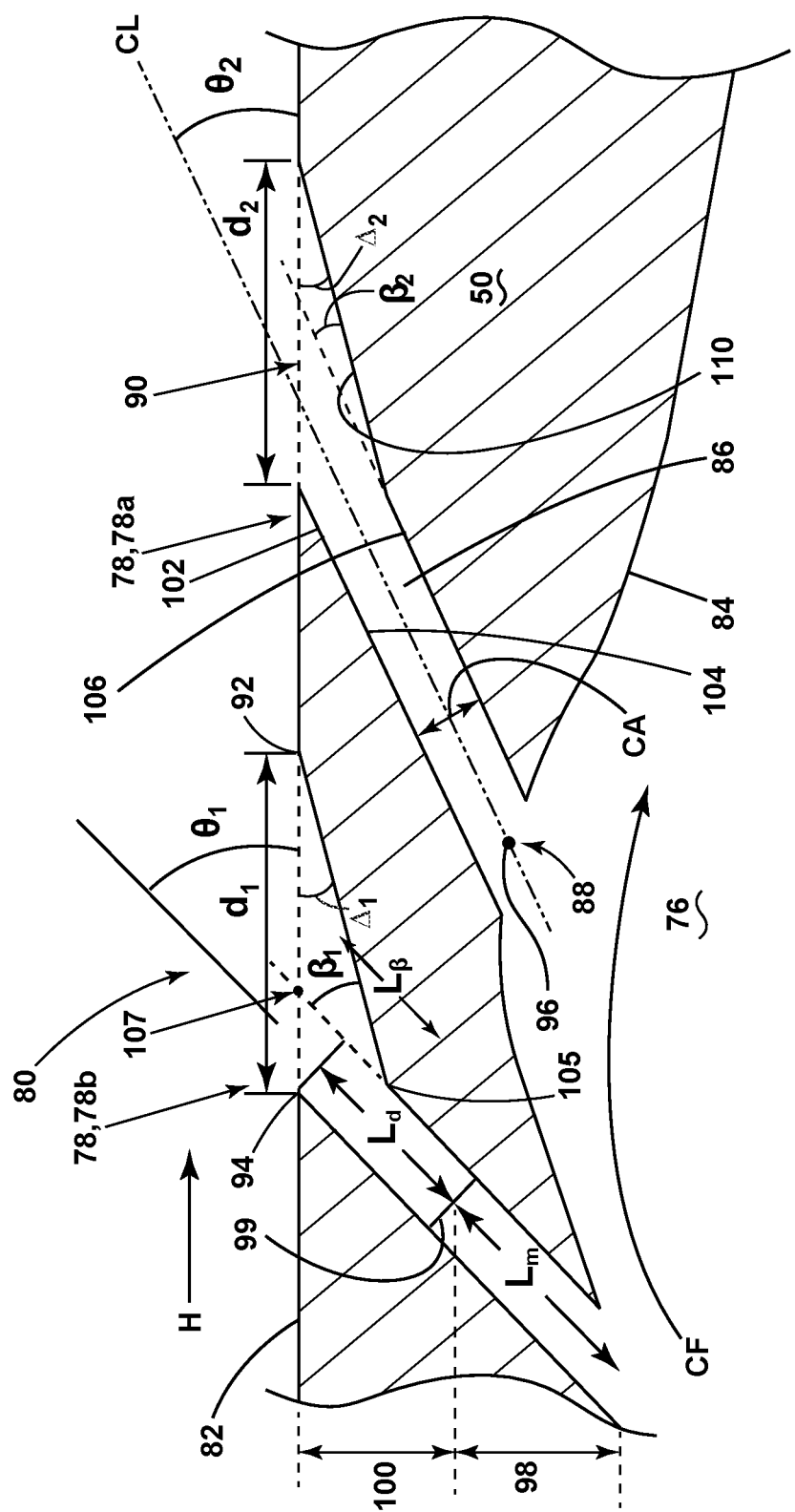
FIG. 5 is a cross-sectional view illustrating a set of cooling holes from the turbine blade of FIG. 3 along line V-V in accordance with various aspects described herein.

A first angle, referred to herein as a surface angle (θ) is formed between a centerline CL of the referenced cooling holes and a heated surface as denoted in FIG. 5.

A second angle, referred to herein as a layback angle (β) is formed between a line extending from a bottom wall of the referenced cooling holes and a layback surface as denoted in FIG. 5.

A third angle, referred to herein as a diffuser angle (Δ) is formed between the straight-line length and the layback surface at the downstream end of the referenced cooling holes as denoted in FIG. 5.

In certain exemplary embodiments of the present disclosure, a gas turbine engine defining a centerline and a circumferential direction is provided. The gas turbine engine can generally include a rotor assembly and a stator assembly. The rotor assembly and the stator assembly can collectively define a substantially annular flowpath relative to the centerline of the gas turbine engine. The rotor assembly can include a set of blades. The set of blades extend from a disk and can be distributed circumferentially about the engine centerline. It is further contemplated that the set of blades can be any number of blades mounted to the disk. The stator assembly includes a set of vanes. The set of vanes extend between inner and outer bands and are distributed circumferentially about the centerline. The set of vanes also defines a set of nozzles. It is further contemplated that the set of vanes includes a single pair of vanes defining a single nozzle. Rotation of the disk causes the set of blades to produce a fluid flow through the set of nozzles.

The number of blades NB and the number of nozzles NN for a stage are both contributors to controlling a flow field across each blade and through the nozzles. The tip radius TR sets a tip clearance value along with a tip rotational speed. For instance, material properties of the blade such as shear, thermal expansion, or the like can affect the tip clearance value at high rotational speeds. In this manner, the number of blades NB, number of nozzles NN, and tip radius TR are integral to the need for certain specific cooling on the blade during operation.

In addition, it can be appreciated that multiple engine operating factors have an effect on blade cooling and aerodynamic performance at a given location within the engine. For instance, upstream nozzle configurations establish the incoming airflow to the blades at a given stage. Nozzles can produce varying-temperature wakes, such as a nozzle exit "hot-cold-hot" wake, that a downstream blade then rotates through during operation. Such nozzle-exit wakes or flow features define incoming flow boundary conditions onto the downstream blade, and also determine a primary condition for setting the blade thermal environment that leads to a blade cooling performance condition.

Another factor to be considered is that the number of blades NB on the disk sets a limit on an overall chord-wise width of each blade, including a chord-wise width of the blade tip. For example, a low number of blades per disk provides for longer chord-wise tip widths, and a high number of blades per disk leads to shorter chord-wise tip widths. It can be appreciated that wider blade tips can require more cooling holes, cooling rows, or larger spacing between a fixed number of cooling holes, to achieve a given cooling performance over the wider surface.

Still another factor to be considered is that the tip radius TR of the blade impacts the clearance between the rotating blade and the stationary outer wall adjacent the tip. A larger clearance will allow for more hot flow to go over the tip of the blade during operation, and a smaller clearance will allow less hot flow to go over the tip. It can be appreciated that a larger tip clearance, with more hot flow over the tip, warrants a higher amount of cooling needed for the blade. The blade tip clearance value is used to determine a specific selection of tip hole placement, spacing, patterning, or the like.

The standard practice for solving the nozzle-exit wake problem has been to design cooling hole outlet patterns for the turbine engine using a baseline condition, e.g. "flight idle," then select a cooling hole layout for the blade at its particular location within the engine, and then verify whether the blade will operate in an acceptable manner across a flight envelope, including from a cooling-performance perspective and an aerodynamic-performance perspective. Such cooling hole layouts are often designed with respect to a baseline blade geometric profile, which can include a baseline pressure-side smoothness.

The inventors' practice has proceeded in the manner of designing a turbine engine with a given number of blades and nozzles, modifying a cooling hole layout on the blade in a particular engine stage, testing the engine with the cooling hole layout for meeting cooling requirements, redesigning the turbine engine (number of stages, blades, nozzles, or the like), if needed, to meet cooling requirements, then checking the cooling performance again. This process can continue for long periods of time until a workable blade design is identified. The above-described iterative process is then repeated for the design of several different types of turbine engines in which the blade will be utilized, such as those shown in the following FIGS. 1 and 2. In other words, an engine can meet the cooling performance requirements but not another necessary benchmark. Examples of the turbine engine and cooling hole layouts developed by the inventors follows.

Referring now to the drawings, FIG. 1 is a schematic view of a turbine engine 10. As a non-limiting example, the turbine engine 10 can be used within an aircraft. The turbine engine 10 can include, at least, a compressor section 12, a combustor 14, and a turbine section 16. A fan 11 is also provided in the engine 10 for providing inlet air to the compressor section 12. A drive shaft 18 rotationally couples the fan 11, compressor section 12, and turbine section 16, such that rotation of one affects the rotation of the others, and defines a rotational axis or centerline 20 for the turbine engine 10.

The compressor section 12 includes a low-pressure (LP) compressor 22 and a high-pressure (HP) compressor 24 serially fluidly coupled to one another. The turbine section 16 includes an HP turbine 26 and a LP turbine 28 serially fluidly coupled to one another. The drive shaft 18 operatively couples the LP compressor 22, the HP compressor 24, the HP turbine 26 and the LP turbine 28 together. In some implementations, the drive shaft 18 includes an LP drive shaft (not illustrated) and an HP drive shaft (not illustrated), where the LP drive shaft couples the LP compressor 22 to the LP turbine 28, and the HP drive shaft couples the HP compressor 24 to the HP turbine 26. An LP spool be defined as the combination of the LP compressor 22, the LP turbine 28, and the LP drive shaft such that the rotation of the LP turbine 28 applies a driving force to the LP drive shaft, which in turn rotates the LP compressor 22. An HP spool can be defined as the combination of the HP compressor 24, the HP turbine 26, and the HP drive shaft such that the rotation of the HP turbine 26 applies a driving force to the HP drive shaft which in turn rotates the HP compressor 24.

While not illustrated, it will be appreciated that the turbine engine 10 can include other components, such as, but not limited to a gearbox. As a non-limiting example, the gearbox can be located at any suitable position within the turbine engine such that it connects one rotating portion to another. As a non-limiting example, the gearbox can connect the fan 11 to the drive shaft 18. The gearbox can allow the fan 11 to run at a different speed than the remainder of the turbine engine 10.

The compressor section 12 includes a plurality of axially spaced stages. Each stage includes a set of circumferentially-spaced rotating blades and a set of circumferentially-spaced stationary vanes. In one configuration, the compressor blades for a stage of the compressor section 12 is mounted to a disk, which is mounted to the drive shaft 18. Each set of blades for a given stage can have its own disk. In one implementation, the vanes of the compressor section 12 is mounted to a casing which extends circumferentially about the turbine engine 10. In a counter-rotating turbine engine, the vanes are mounted to a drum, which is similar to the casing, except the drum rotates in a direction opposite the blades, whereas the casing is stationary. It will be appreciated that the representation of the compressor section 12 is merely schematic and that there can be any number of stages. Further, it is contemplated that there can be any other number of components within the compressor section 12.

Similar to the compressor section 12, the turbine section 16 includes a plurality of axially spaced stages, with each stage having a set of circumferentially-spaced, rotating blades and a set of circumferentially-spaced, stationary vanes. In one configuration, the turbine blades for a stage of the turbine section 16 are mounted to a disk which is mounted to the drive shaft 18. Each set of blades for a given stage can have its own disk. In one implementation, the vanes of the turbine section are mounted to the casing in a circumferential manner. In a counter-rotating turbine engine, the vanes can be mounted to a drum, which is similar to the casing, except the drum rotates in a direction opposite the blades, whereas the casing is stationary. It is noted that there can be any number of blades, vanes and turbine stages as the illustrated turbine section is merely a schematic representation. Further, it is contemplated that there can be any other number of components within the turbine section 16.

The combustor 14 is provided serially between the compressor section 12 and the turbine section 16. The combustor 14 is fluidly coupled to at least a portion of the compressor section 12 and the turbine section 16 such that the combustor 14 at least partially fluidly couples the compressor section 12 to the turbine section 16. As a non-limiting example, the combustor 14 is fluidly coupled to the HP compressor 24 at an upstream end of the combustor 14 and to the HP turbine 26 at a downstream end of the combustor 14.

During operation of the turbine engine 10, ambient or atmospheric air is drawn into the compressor section 12 via the fan 11 upstream of the compressor section 12, where the air is compressed defining a pressurized air. The pressurized air then flows into the combustor 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan 11 and the LP compressor 22. The pressurized airflow and the combustion gases together define a working airflow that flows through the fan 11, compressor section 12, combustor 14, and turbine section 16 of the turbine engine 10.

Figure 2:
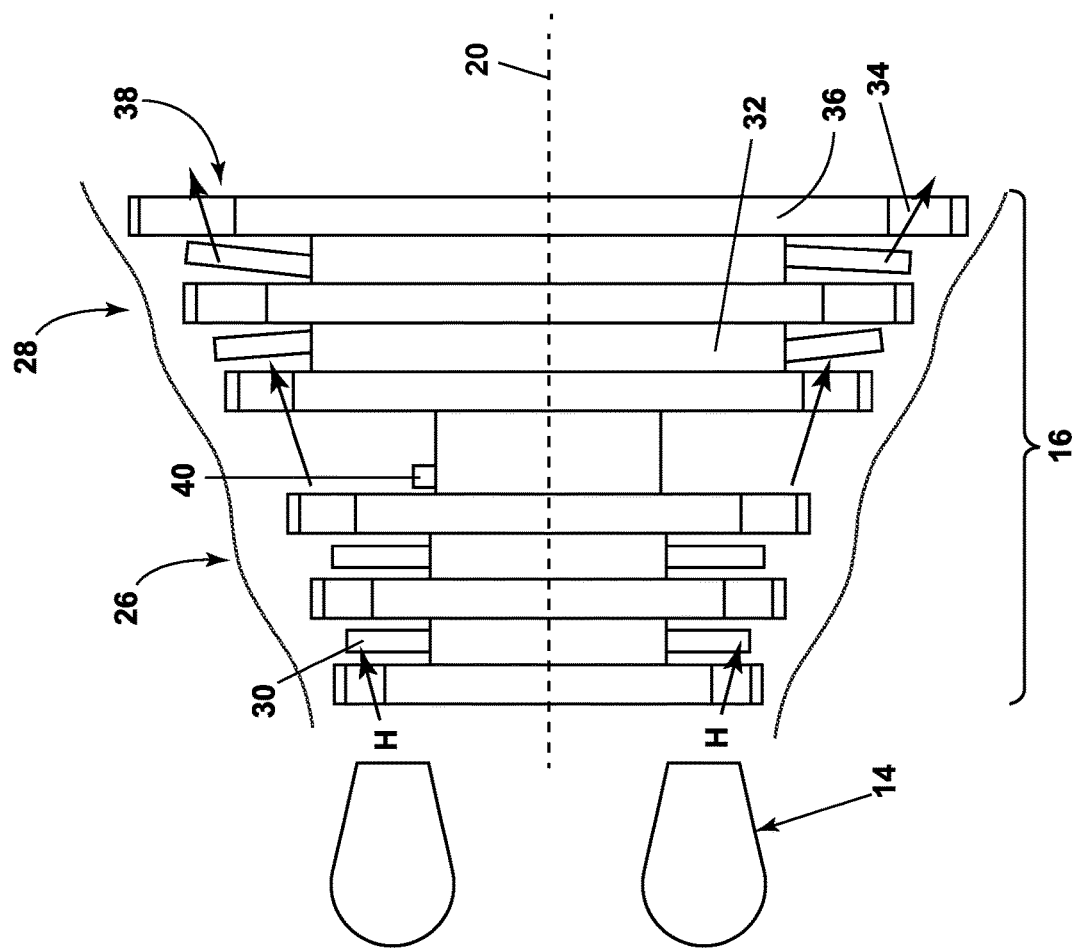
FIG. 2 is a schematic cross-sectional view of a turbine section of the gas turbine engine of FIG. 1 in accordance with an exemplary embodiment of the present disclosure.

Turning to FIG. 2, a portion of the turbine section 16 is schematically illustrated. The turbine section 16 includes blades 30 mounted to corresponding disks 32. Any number of individual blades 30 can be mounted to each disk 32. In some implementations, the blades 30 extend from the disk 32 orthogonally to the engine centerline 20. In some implementations, the blades 30 extend from the disk 23 non-orthogonally to the engine centerline 20.

Stationary vanes 34 are mounted to a stator ring 36 located axially downstream from each of the disks 32. A nozzle 38 is defined by circumferentially-adjacent pairs of vanes 34. Any number of nozzles 38 can be provided on the stator ring 36. In one exemplary configuration, each disk 32 includes at least 60 blades 30, including between 60-70 blades 30, or up to 64 blades 30, in non-limiting examples. Each stator ring 36 includes at least 38 nozzles 38, including between 38-50 nozzles 38, or up to 42 nozzles 38, in non-limiting examples.

During operation of the engine 10, a flow of hot gas (denoted "H") exits the combustor 14 and enters the turbine section 16. Various temperature sensors can be provided for measuring a flow of hot gas temperature at locations within the engine 10. In one example, an EGT sensor 40 is located between the LP turbine 28 and the HP turbine 26. The EGT sensor 40 senses, detects, or measures a temperature of the flow of hot gas H at the indicated location. Multiple EGT sensors 40 can be provided.

For engine performance, the design of the geometry of an individual blade 30 is a function of the temperature of the flow of hot gas H at or near the location of the blade 30, such as within two stages of the blade 30. By way of non-limiting example, an exemplary blade 30 in FIG. 2 has a geometric profile based on the temperature of the flow of hot gas H as measured by the EGT sensor 40.

Figure 3:
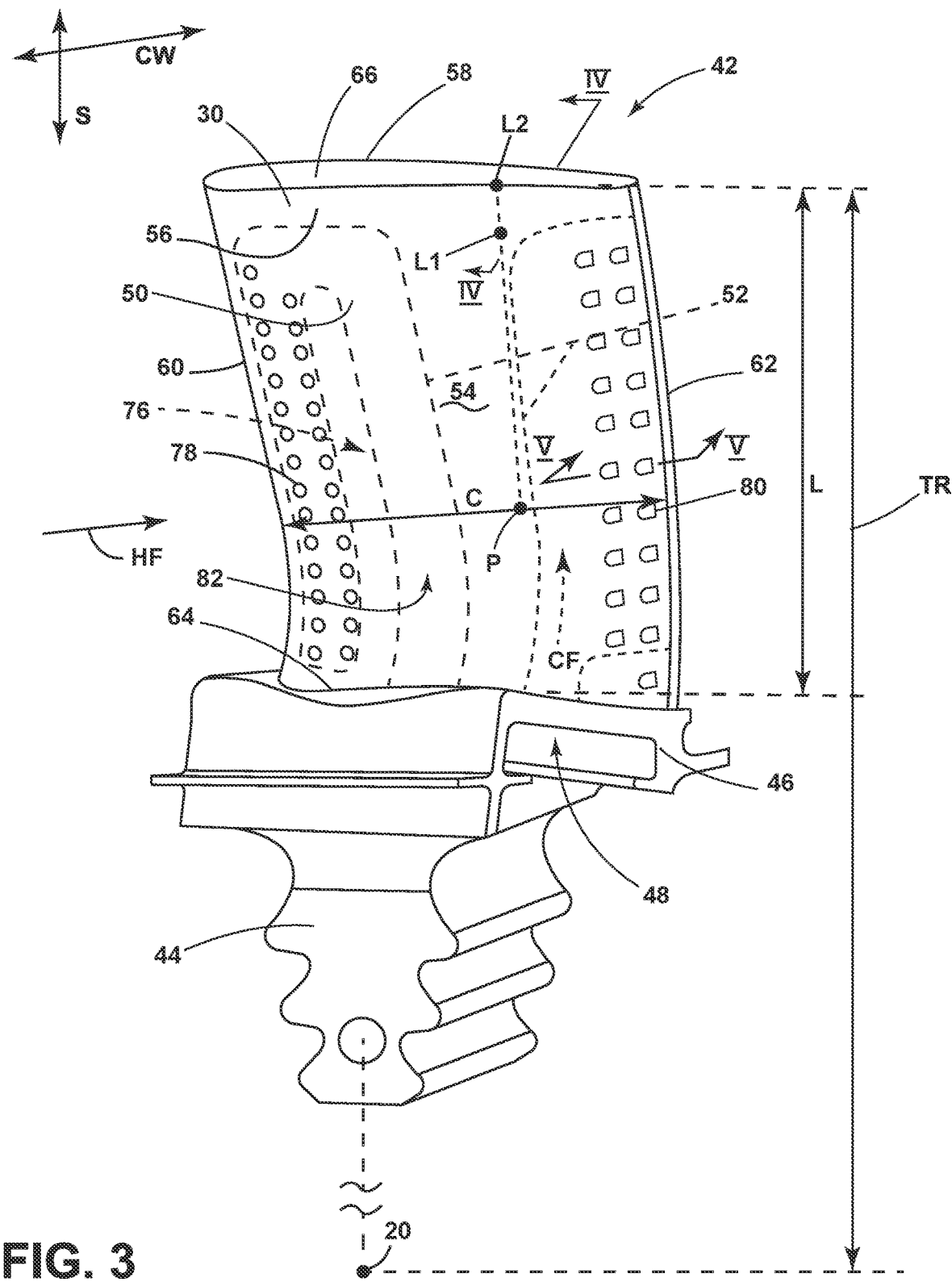
FIG. 3 is a perspective view of a turbine blade suitable for the turbine engine from FIG. 1 in accordance with various aspects described herein.

FIG. 3 is a perspective view of an exemplary blade assembly 42 that can be utilized in the turbine engine 10 (FIG. 1). The blade assembly 42 can include a dovetail 44 and the blade 30. A platform 46 lies between the dovetail 44 and the blade 30 and can provide a mounting surface for the blade 30. When multiple blades 30 are circumferentially arranged in side-by-side relationship, the platform 46 can radially contain the flow of hot gas H and forms the radially inner wall of an annulus through which the flow of hot gas H flows. The dovetail 44 can be configured to mount to the disk 32 (FIG. 2) or similar structure of the engine 10. The dovetail 44 can further include at least one inlet passage 48 extending through the dovetail 44 to provide internal fluid communication with the blade 30.

The blade 30 includes an outer wall 50 bounding an interior 52 and having an exterior surface 54. The blade 30 includes a concave-shaped pressure side 56 and a convex-shaped suction side 58 (hidden from view) which are joined together to define an airfoil cross-sectional shape of the blade 30 extending between a leading edge 60 and a trailing edge 62 to define a chord-wise direction (denoted "CW").

The outer wall 50 forms a root 64 where the blade 30 meets the platform 46. The blade 30 extends radially outward from the root 64 to a tip 66 to define a span-wise direction (denoted "S"). In some examples the span-wise direction S is non-orthogonal to the engine centerline 20 (FIG. 2), such as for blades 30 having a radial curvature between the root 64 and tip 66.

A span-wise length (denoted "L") is indicated for the blade 30 between the tip 66 and the root 64 as shown. In addition, a tip radius TR is indicated between the tip 66 and a center of rotation for the blade 30, as indicated with truncated dashed line from the engine centerline 20.

The interior 52 of the blade 30 can include at least one cooling supply conduit 76, illustrated in dashed line. The cooling supply conduit 76 can be fluidly coupled with the inlet passage 48. At least one cooling hole 78 can be located along any portion of the outer wall 50 including proximate the leading edge 60 and/or the trailing edge 62 as illustrated.

The at least one cooling hole 78 can be part of a set of cooling holes 80 passing through a substrate, which by way of illustration is outer wall 50. The set of cooling holes 80 can define a plurality of cooling holes where there are three or more cooling holes 78 local to each other. It should be understood, however, that the substrate can be any wall within the engine 10 including but not limited to interior walls, a tip wall, or a combustion liner wall. The at least one cooling hole terminates along a heated surface 82 defined by the outer wall 50. The heated surface 82 faces the flow of hot gas H during operation. The at least one inlet passage 48 is fluidly coupled to the set of cooling holes 80 to provide a cooling fluid flow (denoted "CF") for cooling the heated surface 82.

Materials used to form the substrate and the structural segment can include, but are not limited to, steel, refractory metals such as titanium, or superalloys based on nickel, cobalt, or iron, and ceramic matrix composites, or combinations thereof. The substrate and structural segment can be formed by a variety of methods, including additive manufacturing, casting, electroforming, or direct metal laser melting, in non-limiting examples.

Some exemplary first and second locations (denoted "L1" and "L2", respectively) are indicated on the outer wall 50. In the example shown, the first location L1 is at 10%, i.e. 10% of the span-wise length L, and the second location L2 is at 0% of the span-wise length L. Put another way, the second location L2 is at the tip 66.

In addition, an exemplary chord line (denoted "C") is indicated along the blade 30 between the leading edge 60 and trailing edge 62. A chord-wise position P (denoted "P") is also indicated for the first location L1 and the second location L2. The first and second locations L1, L2 share a common chord-wise position between the leading edge 60 and trailing edge 62. FIG. 3 shows the chord line C and span-wise length L as projected onto the plane of the paper. The chord-wise position P, the dashed line extending upwards from P, and the first and second locations L1, L2 reside in this plane.

Figure 4:
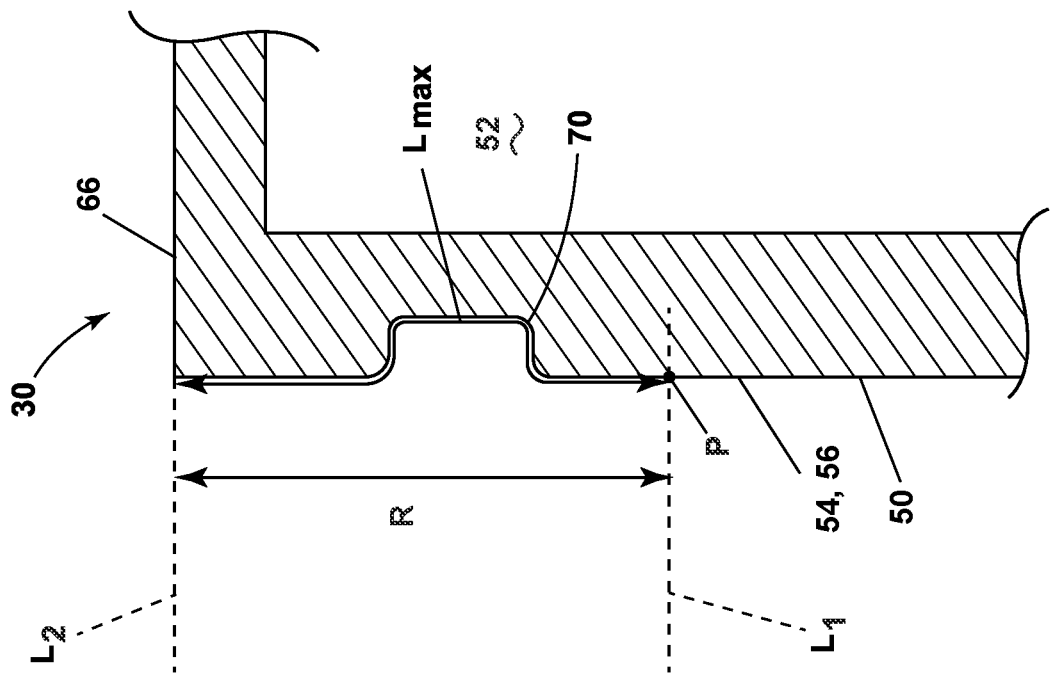
FIG. 4 is a schematic cross-sectional view illustrating a representation of a portion of the tip for the turbine blade of FIG. 3 along line IV-IV.

Turning to FIG. 4, a schematic cross-sectional view of the blade 30 proximate the tip 66 along line IV-IV of FIG. 3 is shown. The pressure side 56 is illustrated along with a portion of the interior 52. In addition, an exemplary surface feature 70 is provided in the outer wall 50. The surface feature 70 is shown in the form of an indent or recess in the outer wall 50. It is also contemplated that the surface feature 70 can include, or alternatively take the form of a protrusion, such as a shelf, extending outwardly (right to left) from the outer wall 50. The surface feature 70 represents a deviation from a locally-flat outer wall 50. Such a deviation also includes surface textures, such as bumps, divots, surface roughness, or the like that may be present on the outer wall 50.

A surface length (denoted "$L_{max}$") is defined by a span-wise contour line along the outer wall 50 between the first location L1 and the second location L2, taken at the common chord-wise position P (FIG. 3) as described above. The surface length $L_{max}$ measures the span-wise length of the pressure side surface contour, taken along the outer wall 50 between L1 and L2, excluding any cooling holes, slots, or other apertures that extend through the outer wall 50 into the interior 52.

A radial length (denoted "R") is defined by a span-wise line extending between the first location L1 and the second location L2. The surface length $L_{max}$ and the radial length R along the span-wise direction S are non-orthogonal to the engine centerline 20 (FIG. 3) in some implementations. As can be understood from FIG. 4, $L_{max}$ is greater than R due to the presence of an indentation. Similarly, $L_{max}$ will be greater than R when there is a protrusion, instead of an indentation. A surface length and a radial length R are measured along the dashed line, which extends perpendicular to the line indicating the chord line C in FIG. 3.

The surface length $L_{max}$ and the radial length R are both defined at the common chord-wise position P. The first and second locations L1, L2 are illustrated in dashed line intersecting the outer wall 50, and the radial length R is indicated as being spaced from the surface length $L_{max}$. It will be understood that this is for visual clarity purposes only, and that both the surface length $L_{max}$ and the radial length R are defined at the common chord-wise position P. It can also be appreciated that the surface length $L_{max}$ is greater than the radial length R when the surface feature 70 is present in the outer wall 50.

Turning to FIG. 5, a cross-section taken along line V-V from FIG. 3 illustrates the set of cooling holes 80 within the outer wall 50. The outer wall 50 defines the heated surface 82 facing the flow of hot gas H and a cooled surface 84 facing the cooling fluid flow CF. The at least one cooling hole 78, illustrated as two cooling holes can each include a connecting passage 86 extending between an inlet 88 on the cooled surface 84 and an outlet 90 on the heated surface 82. The outlet 90 extends between a downstream end 92 and an upstream end 94. It should be understood that the outer wall 50 can be any substrate within the engine 10 including but not limited to the platform 46 (FIG. 3), a tip wall, or a combustion liner wall. It is noted that although the outer wall 50 is shown as being generally planar at the heated surface 82, and curved along the cooled surface 84, it should be understood that that the outer wall 50 can be curved or planar along any surface. The geometry of the at least one cooling hole 78 described herein can include thermal barrier coating, bond-coat, or environmental coating for oxidation or corrosion. It should be understood that the geometry discussed herein is for a set of cooling holes 80 during operation whether that set includes coating or not.

The inlet 88 can define a centerline (denoted "CL") extending from a geometric center 96 of the inlet 88 toward the outlet 90. The centerline CL extends straight through the connecting passage 86 substantially parallel to a top wall 104 and out of the outlet 90, though not necessarily through a geometric center of the outlet 90. As is illustrated by an extension of the centerline CL, a first angle, referred to herein as surface angles ($\theta_1$, $\theta_2$) is formed between the centerline CL and the heated surface 82. The connecting passage 86 can include a metering section 98 having a circular cross section, though it could have any cross-sectional shape. The metering section 98 can be provided at or near the inlet 88, and extend along the connecting passage 86 while maintaining a constant or nearly constant cross-sectional area (denoted "CA"). The metering section 98 defines the smallest, or minimum cross-sectional area CA of the connecting passage 86. The metering section 98 can be located anywhere within the connecting passage 86 where the cross-sectional area CA is the smallest within the connecting passage 86. It is contemplated that the metering section 98 defines the inlet 88 and extends therefrom as illustrated to a metering end 99. The metering section 98 can define a metering length (denoted "Ln") within the connecting passage 86. The metering length Lm is greater than zero. The metering section 98 is for metering of the mass flow rate of the cooling fluid flow CF.

A diffusing section 100 can extend from the metering section 94 to the outlet 90 within the connecting passage 86.

The diffusing section 100 can include a hood 102 having a diffused length (denoted "La") measured along the centerline CL from the metering section 98 to the upstream end 94 of the outlet 90. The connecting passage 86 can have a top wall 104 and a bottom wall 106. The hood 102 defined by at least a portion of the top wall 104. The diffusing section 100 can have a layback surface 110 extending from the bottom wall 106 at a junction 105 to the heated surface 82 to define the downstream end 92 of the outlet 90. The layback surface 110 can define at least a portion of the outlet 90 and the diffusing section 100. The layback surface 110 can bend away from the bottom wall 106 at a second angle, referred to herein as layback angles ($\beta_1$, $\beta_2$). While illustrated as flat, it should be understood that the layback surface 110 is not necessarily flat and that the angles described herein are with respect to an average slope of the layback surface 110 and the surface with which any of the angles herein are described. The diffusing section 100 can enable diffusion into and out of the page between the metering end 99 and the junction 105. Diffusion can continue into and out of the page as well as up and down with respect to the page between the junction 105 and the outlet 90. It is further contemplated that the diffusion section 100 starts at the junction 105.

The at least one cooling hole 78 provides fluid communication between the cooling supply conduit 76 and the exterior surface 54. During operation, the cooling fluid flow CF can be supplied via the inlet passages 48 (FIG. 3) and exhausted from the set of cooling holes 80 as a thin layer or film of cool air along the heated surface 82. While two cooling holes are shown in FIG. 5, it is understood that the cross-sectional view can represent any one of or all of the cooling holes in the set of cooling holes 80.

The at least one cooling hole 78 can be a first cooling hole 78a and a second cooling hole 78b. The first cooling hole 78a can define a first surface angle ($\theta_1$) and a first layback angle ($\beta_1$). The outlet 90 of the first cooling hole 78a can extend a first distance ($d_1$) between the downstream end 92 and the upstream end 94. The second cooling hole 78b can define a second surface angle ($\theta_2$) and a second layback angle ($\beta_2$). The outlet 90 of the second cooling hole 78b can extend a second distance ($d_2$) between the downstream end 92 and the upstream end 94. The first and second distances ($d_1$, $d_2$) can be measured along a straight-line between the downstream and upstream ends 92, 94. Cooling holes with nearly constant layback angles ($\beta$) for any surface angle ($\theta$), in other words, where ($\beta_1 \cong \beta_2$) can have smaller outlets as the surface angle increases. To maximize cooling effectiveness, it was found to be beneficial for the first and second distances ($d_1$, $d_2$), to be consistent, that is nearly the same or equal along the outer wall 50 for all cooling holes 78.

In order to provide consistent cooling along the heated surface 82, the first and second distances ($d_1$, $d_2$) should be close to if not equal to each other. In other words, ($d_1 \cong d_2$). It has been found that when the first distance ($d_1$) is within 5% of the second distance $d_2$, or when the first distance ($d_1$) is equal to the second distance ($d_2$), the most effective cooling along the heated surface 82 occurs. The set of cooling holes 80 can include three or more cooling holes 78 where ($d_1 \cong d_2 \cong d_3$). This consistency lends itself to uniform film cooling, which in turn improves coating compensation. In order to maintain this consistency, several iterations of cooling holes 78 with a given distance, by way of non-limiting example 2 mm, were made for various locations along the blade 30 with various curvatures. TABLE 1 includes three different cooling holes all having the same distance. While these cooling holes can be arranged in a row, or sequential with respect to each other, it should be understood that the distance value and the location on the blade 30 determines the surface angle ($\theta$), layback angle ($\beta$) and the diffuser angle ($\Delta$).

TABLE 1

| Curvature | d (mm) | $\theta$ | $\beta$ | $\Delta$ |
| --- | --- | --- | --- | --- |
| High | 2 | 50° | 37° | 13° |
| Low | 2 | 22° | 6° | 16° |
| Normal | 2 | 30° | 12° | 18° |

To achieve this consistency with the distance (d) and increase cooling effectiveness, it was found unexpectedly and through a time-consuming iterative process, that while the surface angle ($\theta$) changes with a curvature of the blade 30, the layback angle ($\beta$) and the diffuser angle ($\Delta$) form an interdependent relationship. Geometrically, the difference between the surface angle ($\theta$) and the layback angle ($\beta$) is the diffuser angle ($\Delta$), in other words ($\Delta = \theta - \beta$). This relationship remains regardless of whether the layback surface 110 is straight, or flat as illustrated. Therefore, as the surface angle increases either the layback angle ($\beta$) remains substantially constant or the diffuser angle ($\Delta$).

Finding the balance between effective cooling with the set of cooling holes and the blade geometry described herein is a labor- and time-intensive process, because the process is iterative and involves the selection of various cooling hole layouts designed for (in one example) flight idle, and then evaluating whether at other times in flight (e.g. non-flight idle) the cooling hole layout provides acceptable cooling for the blade. In some examples, the blade may have a different pressure-side smoothness compared to a baseline pressure-side smoothness on which the cooling hole layout was designed. Put another way, the cooling hole layout was often selected accordingly for various blade configurations before a cooling hole layout was found that satisfies all design requirements: cooling performance, aerodynamic performance, pressure ratio, rigidity, durability, thermal stresses, noise transmission levels, or the like.

For improved results, it is desirable to have consistent distance measurements as this promotes uniform surface cooling. In order to provide consistent distance measurements ($d_1$, $d_2$) on various locations on the blade 30 described herein when the first and second surface angles ($\theta_1, \theta_2$) are not necessarily the same, a given range of angle values ($\alpha$) for the first and second layback angles ($\beta_1$, $\beta_2$) as well as the first and second diffuser angles ($\Delta_1$, $\Delta_2$) should be the same above and below a switch value ($\theta_s$) of the surface angle ($\theta$). The switch value ($\theta_s$) is the value for the surface angle ($\theta$) at which the ranges for the layback angle ($\beta$) switch to the ranges of the diffuser angle ($\Delta$) and vice versa. This was an unexpected result discovered during the course of engine designs that involved a time-consuming iterative process, as previously described.

In one non-limiting example, the given range of angle values is ($8° < \alpha < 20°$). The first surface angle is 40 degrees ($\theta_1 = 40°$) and the second surface angle is 25 degrees ($\theta_2 = 25°$). The first layback angle is 30 degrees ($\beta_1 = 30°$), giving a value of 10 degrees for the first diffuser angle ($\Delta_1 = 10°$) and for the subsequent second cooling hole 78b, the second layback angle is 10 degrees ($\beta_2 = 10°$), and the second diffuser angle is equal to 15 degrees ($\Delta_2 = 15°$). The given range of angle values ($8° < \alpha < 20°$) is true for the value of the second layback angle ($8° < \beta_2 = 10° < 20°$). The given range of angle values ($8° < \alpha < 20°$) is true for the value of the first diffuser angle ($8°<\Delta_1=10°<20°$). In this case, the given range of angle values ($\alpha$) for the first and second layback angles ($\beta_1$, $\beta_2$) as well as the first and second diffuser angles ($\Delta_1$, $\Delta_2$) is the same above and below the switch value ($\theta_s=28°$). In other words, it was found unexpectedly that maintaining the consistency for the distances ($d_1$, $d_2$), for any range of angle values ($\alpha$): ($\alpha_{low}<\alpha<\alpha_{hi}$) where $\alpha_{hi}+\alpha_{low}=\theta_s$ can be summed up in two if/then statements. The value of the surface angle ($\theta$), the layback angle ($\beta$) and the diffuser angle ($\Delta$) are all related by the following:

If $\alpha_{hi} + \alpha_{low} \le \theta$, then $\alpha_{low} < \Delta < \alpha_{hi}$ (1)

If $\alpha_{hi} + \alpha_{low} \ge \theta$, then $\alpha_{low} < \beta < \alpha_{hi}$ (2)

Exemplary value ranges are shown in TABLE 2. As the range of angles ($\alpha$) narrows (from the top row to the bottom row) the value at which the surface angle ($\theta$), flips from (1) to (2) decreases. Regions of the blade 30 with high curvature, such as along the suction side 58 have larger ranges, such as those in the first two rows of TABLE 2. Regions of the blade 30 with low curvature, such as along the pressure side 62 have smaller ranges, such as those in the last two rows of TABLE 2.

TABLE 2

| $\alpha_{low}$ | $\alpha_{hi}$ | $\alpha_{hi} + \alpha_{low}$ | $\theta$ | $\Delta_{low}$ | $\Delta_{hi}$ | $\beta_{low}$ | $\beta_{hi}$ |
|---|---|---|---|---|---|---|---|
| 5° | 40° | 45° | 50° | 5° | 40° | 10° | 45° |
|  |  |  | 40° | 0° | 35° | 5° | 40° |
| 10° | 30° | 40° | 45° | 10° | 30° | 15° | 35° |
|  |  |  | 35° | 5° | 25° | 10° | 30° |
| 10° | 20° | 30° | 35° | 10° | 20° | 15° | 25° |
|  |  |  | 25° | 5° | 15° | 10° | 20° |
| 12° | 16° | 28° | 30° | 12° | 16° | 14° | 18° |
|  |  |  | 20° | 4° | 8° | 12° | 16° |

Figure 6:
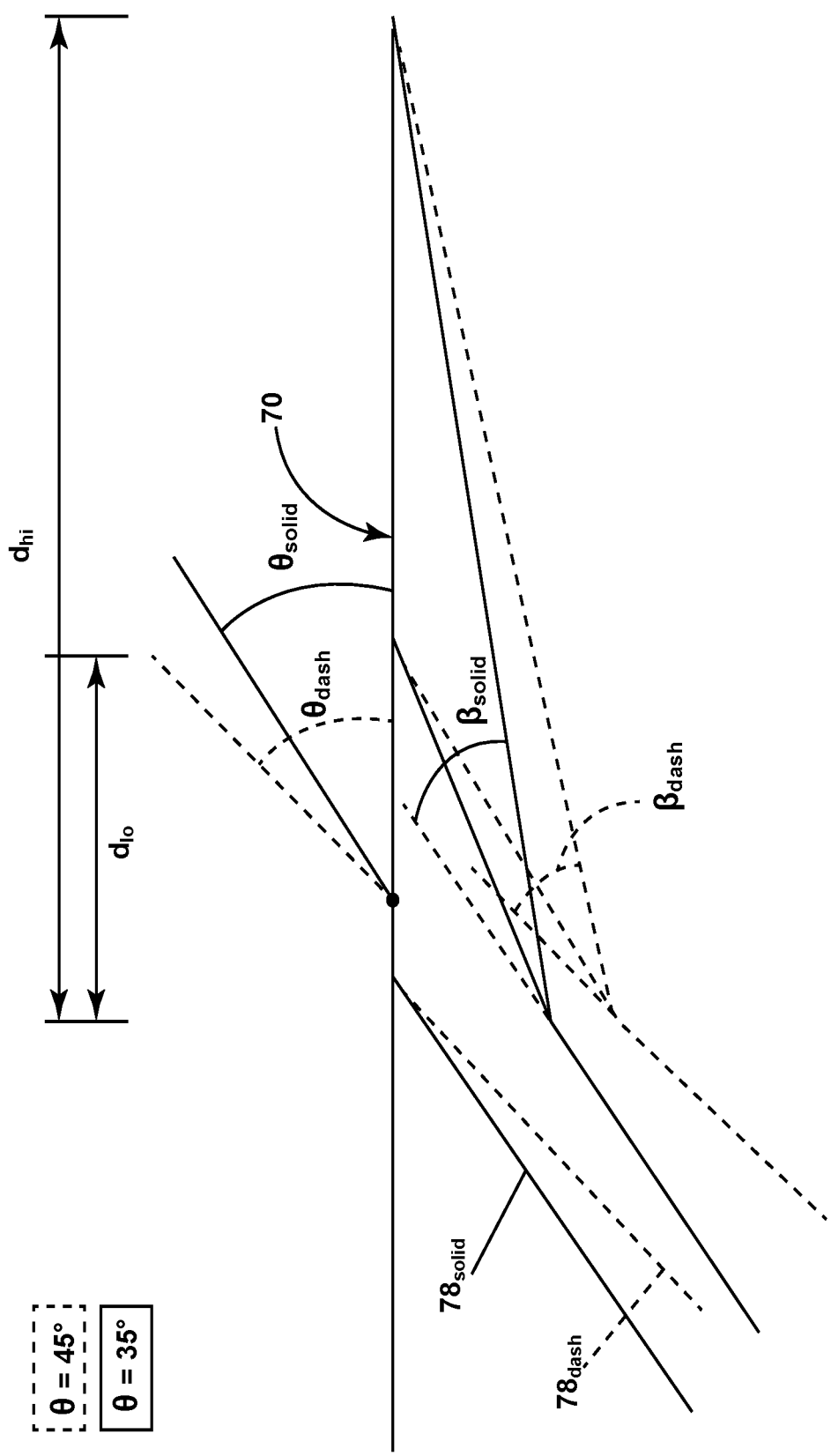
FIG. 6 is a schematic cross-sectional view of overlapping cooling hole geometries having varying surface angles, layback angles, and diffuser angles in accordance with various aspects described herein.

Turning to FIG. 6, overlapping cooling hole geometries, a solid geometry $78_{solid}$ and a dashed geometry $78_{dash}$, are illustrated for exemplary range ($\alpha$): ($10°<\alpha<30°$) from row 2 of TABLE 1 with exemplary surface angles ($\theta_{solid}=35°$ and $\theta_{dash}=45°$). It can clearly be seen that the relationship of Expressions (1) and (2) encompasses a range of distance values between a high value ($d_{hi}$) and a low value ($d_{lo}$) that are equal for the two different surface angles ($\theta_{solid}$, $\theta_{dash}$). To achieve the same distance, in this particular case, the dashed geometry $78_{dash}$ layback angle ($\beta_{dash}$) can have a range between 15 and 35 degrees ($15°<\beta_{dash}<35°$) while the solid geometry $78_{solid}$ layback angle ($\beta_{solid}$) can have a range between 15 and 35 degrees ($10°<\beta_{dash}<30°$).

Figure 7:
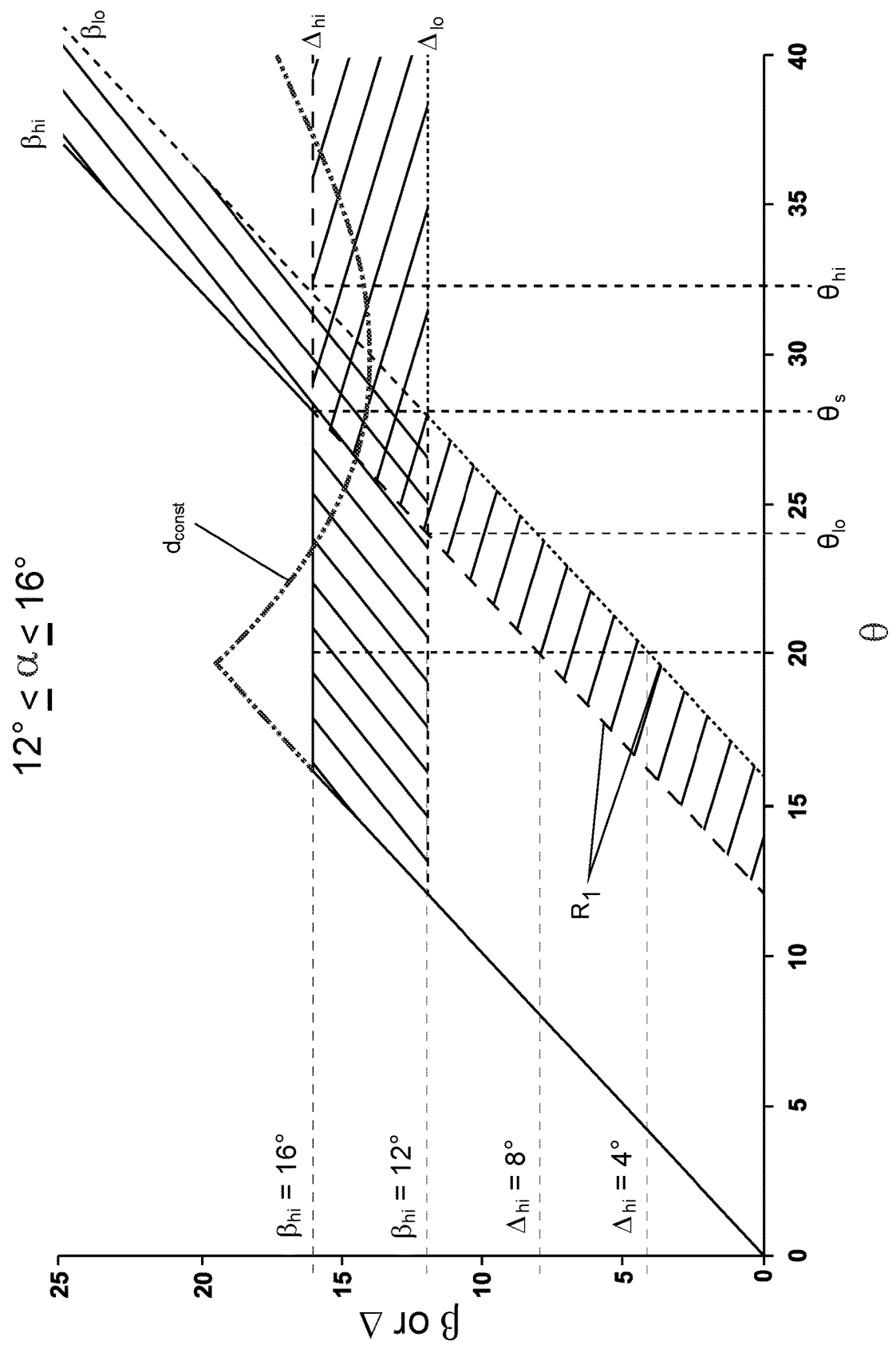
FIG. 7 is a graph illustrating a first exemplary range of values for surface angles, layback angles, and diffuser angles in accordance with various aspects described herein.

FIG. 7, is a graph illustrating exemplary range ($\alpha$): ($12°\le\alpha\le16°$) from row four of TABLE 2 for surface angle values ($0°<\theta<40°$) represented along the x-axis. Four lines ($\beta_{hi}$, $\beta_{lo}$, $\Delta_{hi}$, $\Delta_{lo}$) representing the corresponding maximum and minimum values for layback and diffuser angles ($\beta$, $\Delta$) are illustrated. The y-axis represents corresponding values for both the layback and diffuser angles ($\beta$, $\Delta$) for the respective lines ($\Delta_{hi}$, $\Delta_{lo}$, $\beta_{hi}$, $\beta_{lo}$). For example, at $\theta=20°$, $\Delta_{hi}=8°$, $\Delta_{lo}=4°$, $\beta_{hi}=16°$, and $\beta_{lo}=12°$, illustrated in dashed line. The switch value ($\theta_s$) is shown in dashed line and has a value of ($\theta_s=28°$). It should be noted that between a surface angle with a lower value ($\theta_{lo}$) and a surface angle with a higher value ($\theta_{hi}$), the corresponding ranges for the layback and diffuser angle values ($\beta$, $\Delta$) overlap: If $\theta_{lo}\le\theta\le\theta_{hi}$, then $\Delta_{lo}<\beta<\beta_{hi}$ and $\Delta_{lo}<\Delta<\beta_{hi}$. TABLE 3 illustrates all the corresponding ranges for ($\alpha$):

($12 \le \alpha \le 16$).

TABLE 3

| $\theta_s = 12° + 16° = 28°$ | Layback angle ($\beta$) | Diffuser angle ($\Delta$) |
|---|---|---|
| $25° \le \theta \le 32°$ | $9° < \beta < 20°$ | $9° < \Delta < 20°$ |
| $\theta \le 28°$ | $12° \le \beta \le 16°$ | $\Delta < 16°$ |
| $\theta \ge 28°$ | $12° < \beta$ | $12° \le \Delta \le 16°$ |

The graph illustrates how below the switch value ($\theta_s$) for the surface angle ($\theta$), the diffuser angle ($\Delta$) increases in value at a first rate R1 as the surface angle ($\theta$) increases, while the layback angle ($\beta$) remains constant. Above the switch value ($\theta_s$) of the surface angle ($\theta$), the layback angle ($\beta$) increases in value at the same first rate R1 as the surface angle ($\theta$) increases, while the diffuser angle ($\Delta$) remains constant.

Furthermore, a line ($d_{const}$) representing layback angle ($\beta$) and diffuser angle ($\Delta$) values corresponding with surface angle ($\theta$) values for a constant distance (d) is illustrated. Distances (d) at angles along line ($d_{const}$) have dimensions that are the same. For example, a first cooling hole has a surface angle of $\theta=25°$, which is less than the switch value of $\theta_s=28°$, a layback angle of $\beta=15.3°$ and a diffuser angle of ($25°-15.3°$) or $\Delta=9.7°$. A neighboring cooling hole has a surface angle of $\theta=32°$, which is greater than the switch value of $\theta_s=28°$, a layback angle of $\beta=15.1°$ and a diffuser angle of ($28°-15.1°$) or $\Delta=16.9°$. These two sets of values occur along the same line ($d_{const}$), and therefore the first cooling hole has a distance (d) that is equal to a distance (d) of the neighboring cooling hole.

TABLE 4 generalizes all corresponding ranges for any range of angle values ($\alpha$):

($\alpha_{low} < \alpha < \alpha_{hi}$):

TABLE 4

| $\alpha_{low} + \alpha_{hi} = \theta_s$ | Layback angle ($\beta$) | Diffuser angle ($\Delta$) |
|---|---|---|
| $\theta \le \theta_s$ | $\alpha_{low} \le \beta \le \alpha_{hi}$ | $\Delta < \alpha_{hi}$ |
| $\theta \ge \theta_s$ | $\alpha_{low} < \beta$ | $\alpha_{low} \le \Delta \le \alpha_{hi}$ |

TABLE 5 gives corresponding ranges associated with a high curvature region of the blade 30 for $5°\le\alpha\le40°$.

TABLE 5

| $5° + 40° = 45°$ | Layback angle ($\beta$) | Diffuser angle ($\alpha$) |
|---|---|---|
| $\theta \le 45°$ | $5° \le \beta \le 40°$ | $\Delta < 40°$ |
| $\theta \ge 45°$ | $5° < \beta$ | $5° \le \Delta \le 40°$ |

TABLE 6 gives corresponding ranges associated with a low curvature region of the blade 30 for $10°\le\alpha\le20°$.

TABLE 6

| $10° + 20° = 30°$ | Layback angle (β) | Diffuser angle (α) |
|---|---|---|
| θ ≤ 30° | 10° ≤ β ≤ 20° | Δ < 20° |
| θ ≥ 30° | 10° < β | 10° ≤ Δ ≤ 20° |

Figure 8:
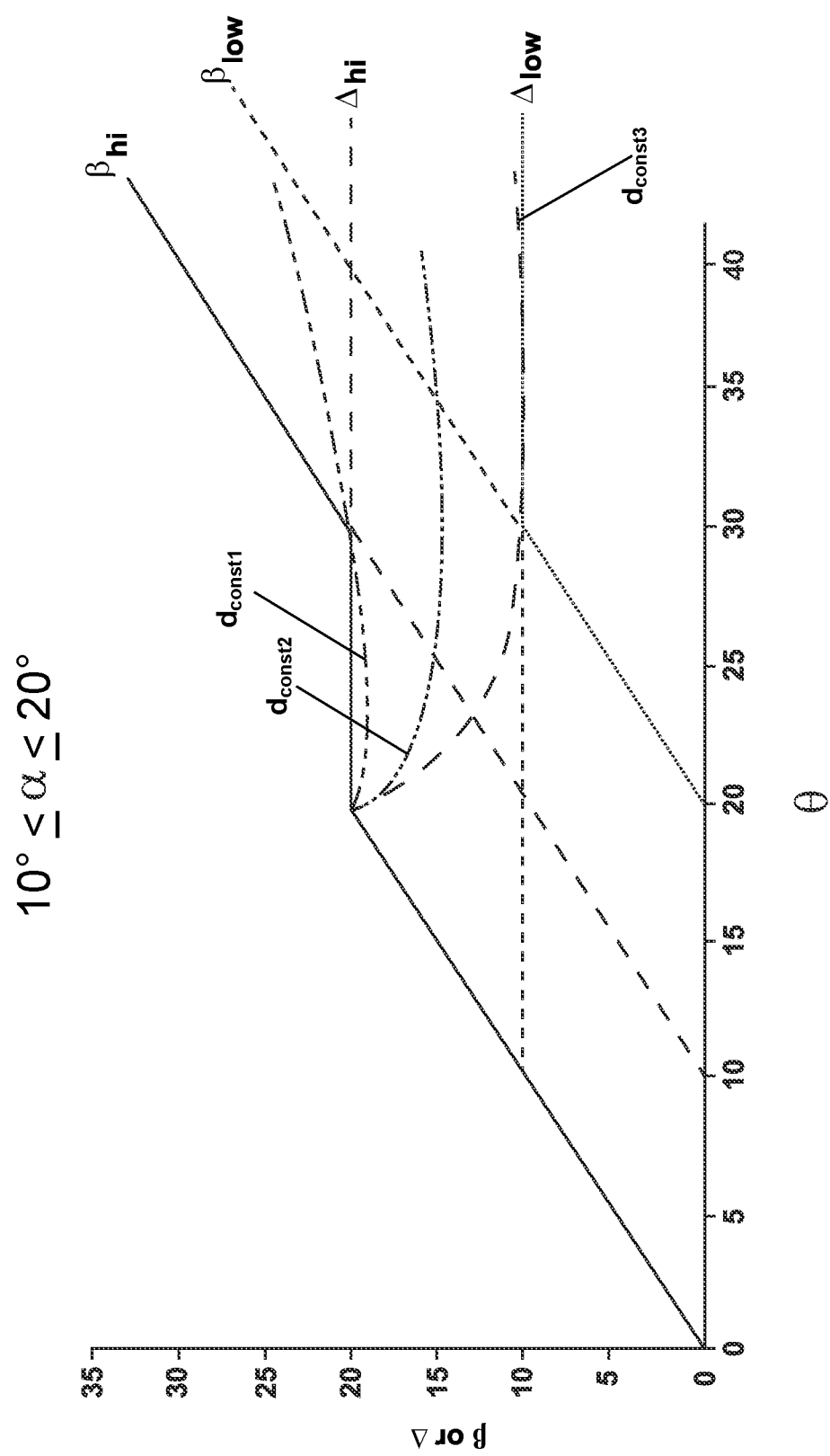
FIG. 8 is a graph illustrating a second exemplary range of values for surface angles, layback angles, and diffuser angles in accordance with various aspects described herein.

Turning to FIG. 8, a graph illustrating the exemplary range (α): ($10°≤α≤20°$) from TABLE 6 for surface angle values ($0°<θ<40°$) represented along the x-axis. Like FIG. 7 four lines representing the corresponding maximum and minimum values for layback and diffuser angles ($β_{hi}$, $β_{low}$, $Δ_{hi}$, $Δ_{low}$) are illustrated with the cross-hatch removed. Three lines ($d_{const1}$, $d_{const2}$, $d_{const3}$) representing layback angle (β) and diffuser angle (Δ) values corresponding with surface angle (θ) values for various constant distance values (d) are illustrated.

Referring briefly back to FIG. 5, a length (denoted "$L_β$") between junction 105 and point 107 measured along the dashed line for the diffuser angle (β) increases as the diffuser angle (β) decreases. The length $L_β$ can be measured in terms of a hydraulic diameter (denoted "$D_h$") of the corresponding cooling hole. Utilizing the law of sines, a relationship between the distance (d) and the angles described herein was found:

$$d_{const} = \frac{D_h}{\sin θ} + \frac{L_β \cdot \sin β}{\sin Δ} \quad (3)$$

A first line ($d_{const1}$) is for when the length is twice the hydraulic diameter ($L_β = 2D_h$), a second line ($d_{const2}$) is for when the length is equal to the hydraulic diameter ($L_β = D_h$), and a third line ($d_{const3}$) is for when the length is half the hydraulic diameter ($L_β = 0.5 D_h$). It can be seen that relatively higher diffuser angles within the range in TABLE 6 (β=19°) are associated with longer lengths ($L_β = 2D_h$) while relatively lower diffuser angles within the same range (β=11°) are associated with shorter lengths ($L_β = 0.5 D_h$).

Benefits associated with the distance lines within the range are a quick solution to the problem described herein. As was previously described, to maximize cooling effectiveness, it was found to be beneficial for the first and second distances (d1, d2), to be consistent, that is nearly the same or equal. Utilizing the distance lines enables more accurate cooling hole geometry and in turn higher cooling effectiveness.

Benefits associated with the ranges described herein include a quick visualization of cooling hole geometry for different portions of the blade. Narrowing the ranges enables the manufacturing of a high performing blade with peak performance. While narrowing the ranges to regions of possibilities saves time, money, and resources, the largest benefit is at the system level, where higher-performing blades enable improved system performance. Previously developed blades may peak in one area of performance where cooling holes have the most desirable distance (d), but lose efficiency or lifetime benefits in another area of performance where cooling holes vary in terms of distance (d). In other words, the ranges considered enable the development and production of higher performing blades across multiple performance metrics within a given set of constraints.

As described earlier, finding a workable solution to the nozzle-exit problem involves finding the balance between effective cooling and aerodynamic performance by way of the cooling holes and blade geometry described herein. This is a labor- and time-intensive process, because the process is iterative and involves the selection of various cooling hole layouts designed for (in one example) flight idle, and then evaluating whether at other times in flight (e.g. non-flight idle) the cooling hole layout provides acceptable cooling for the blade. In some examples, the blade may have a different pressure-side smoothness compared to a baseline pressure-side smoothness on which the cooling hole layout was designed. Put another way, the cooling hole layout was often selected accordingly for various blade configurations before a cooling hole layout was found that satisfies all design requirements, e.g. cooling performance, aerodynamic performance, pressure ratio, rigidity, durability, thermal stresses, noise transmission levels, or the like.

TABLE 7 below illustrates some cooling hole configurations that yielded workable solutions to the nozzle-exit wake problem.

TABLE 7

| Example: | 1 | 2 | 3 | 4 | 5 | 6 | 7 | 8 |
|---|---|---|---|---|---|---|---|---|
| TR (in) | 15.25 | 15.45 | 15.50 | 15.60 | 15.30 | 15.65 | 15.70 | 15.75 |
| EGT (° C.) | 1090 | 1090 | 990 | 1020 | 1080 | 1070 | 1000 | 990 |
| NB | 60 | 60 | 64 | 62 | 62 | 60 | 64 | 64 |
| NN | 42 | 42 | 38 | 40 | 42 | 40 | 38 | 38 |
| $L_{max}$ (in) | 0.205 | 0.205 | 0.253 | 0.219 | 0.224 | 0.245 | 0.235 | 0.253 |
| R (in) | 0.205 | 0.205 | 0.205 | 0.210 | 0.218 | 0.217 | 0.220 | 0.205 |

It was discovered, unexpectedly, during the course of engine design and the time-consuming iterative process previously described, that a relationship exists between the number of blades NB per stage, the number of nozzles NN per stage, the tip radius TR, the exhaust gas temperature EGT, and the blade parameter BP that yielded improved results. Improved results were found when a degree of flatness (represented by BP) and cooling hole distribution was tied to the number of blades NB per stage, the number of nozzles NN per stage, the tip radius TR, and the exhaust gas temperature EGT. Whereas a cooling hole pattern and degree of flatness may provide a desired result for one engine configuration, that same combination would not necessarily provide the desired result for another engine configuration. The inventors found that an improved blade performance was found not simply based on experiments of the blade subjected to aerodynamic, thermal, and dynamic environments generally applicable to a variety of engine configurations. Rather, a better blade design is found when blade properties (flatness, e.g., FIG. 4, and cooling hole distribution, e.g., FIGS. 5-6) are made dependent to the specific environment created by the engine to which the blade is installed, which environment is represented by NB, NN, TR and EGT.

Such a relationship can narrow the vast range of possible blade designs down to a range providing working solutions with a desired degree of thermal efficiency for the specific engine configuration. After conducting numerous cycle tests during transient conditions (e.g., take-off and approach), it was found that reducing a blade surface contour (e.g. reducing a tip shelf contour), in combination with a repeating pattern of cooling holes relative to a flat surface (where the blade parameter BP is greater than or equal to 1) at the 90-100% span location on the blade, results in an highly useful and desirable blade with respect to cooling performance, aerodynamic performance, durability, and cycle life for the blade for particular engine configurations.

Moreover, by utilizing this relationship, the inventors found that the number of suitable or feasible blades to be placed in a turbine engine that are capable of meeting the design requirements could be greatly reduced, thereby facilitating a more rapid down-selection of blade designs to consider as an engine is being developed. Such benefit provides more insight to the requirements for a given engine, and to the requirements for particular component locations within the engine, long before specific technologies, integration, or system requirements are developed fully. The discovered relationship also avoids or prevents late-stage redesign while also providing a blade design that integrates both efficient performance and cooling effectiveness.

The desired relationship is represented by a blade tip durability factor (denoted "BTDF"):

$$BTDF = \left(\frac{TR}{EGT}\right) \times \left(\frac{NB}{NN}\right) \times BP \qquad (4)$$

where TR is the tip radius, EGT is the exhaust gas temperature, NB is the number of blades per disk 32, NN is the number of nozzles 38, and BP is the blade parameter:

$$BP = \frac{L_{max}}{R} \qquad (5)$$

wherein the surface length $L_{max}$ is measured as a contour line along the outer wall 50 between the first and second locations L1, L2, including any local surface curvatures, and wherein the radial length R is measured along the span-wise line between the first and second locations L1, L2 at the same or common chord-wise position as the surface length $L_{max}$. In other words, the blade parameter BP is greater than 1 when the ratio of $L_{max}/R$ is greater than 1 at a given chord-wise position. As described above, the blade parameter BP is greater than 1 when either a surface indent/recess or a surface protrusion is present on the outer wall 50. Minimum and maximum values for blade and engine characteristics, respectively, where expressions (4) and (5) apply and are consistent with the teachings in the disclosure are provided below in Table 8.

TABLE 8

| Parameter | Minimum Value | Maximum Value |
|---|---|---|
| TR (in) | 15.25 | 15.75 |
| EGT (° C.) | 990 | 1090 |
| NB | 60 | 64 |
| NN | 38 | 42 |
| $L_{max}$ (in) | 0.205 | 0.253 |
| R (in) | 0.205 | 0.224 |
| BP | 1.000 | 1.234 |
| BTDF (in/° C.) | 0.020 | 0.033 |

BP and BTDF values corresponding to Examples 1-8 are provided below in Table 9.

TABLE 9

| Example: | 1 | 2 | 3 | 4 | 5 | 6 | 7 | 8 |
|---|---|---|---|---|---|---|---|---|
| BP | 1.000 | 1.000 | 1.234 | 1.043 | 1.028 | 1.129 | 1.068 | 1.234 |
| BTDF | 0.020 | 0.020 | 0.033 | 0.025 | 0.021 | 0.025 | 0.028 | 0.033 |

It was found that the range of values for BP and BTDF in TABLE 8 above correlate to a generally flat blade surface without surface features 70 (FIG. 3) while still providing desired blade cooling and performance as stated in the range for BTDF. A blade parameter BP of 1 corresponds to a perfectly flat blade outer wall, where $R = L_{max}$ as described above. Surface protrusions or recesses, e.g. a shelf or pocket, causes $L_{max}$ to be larger than R by more than 10% and introduces a need for redesigned cooling mechanisms for the extra surface area. The range for BP between 1-1.234 as described in TABLE 8 above allows for the blade outer wall to have an overall smooth blade surface with minor surface roughness or textures present while still preserving desired cooling and performance.

In addition, it was found that a narrowed design range for the tip radius TR being within 15.45-15.50 inches, as shown in Examples 2-3 in TABLE 7 above, provided for desirable blade cooling and performance, while the resulting narrowed minimum and maximum BTDF values did not differ by more than 2% from the values in TABLE 8 above.

Additional benefits associated with the BTDF described herein include a quick assessment of design parameters in terms of blade size, engine temperature, and blade and vane numbers for engine design and particular blade design. While narrowing these multiple factors to a region of possibilities saves time, money, and resources, the BTDF described herein enables the development and production of high-performance turbine engines and blades across multiple performance metrics within a given set of constraints.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A component for a turbine engine which generates a hot gas fluid flow, and provides a cooling fluid flow, comprising a wall separating the hot gas fluid flow from the cooling fluid flow and having a heated surface along which the hot gas fluid flow flows and a cooled surface facing the cooling fluid flow; and at least one cooling hole comprising a passage extending between an inlet at the cooled surface and an outlet at the heated surface, the passage defining a centerline forming a first angle (θ) with the heated surface, the passage having a top wall and a bottom wall each extending from the inlet toward the outlet, and a layback surface defining at least a portion of the outlet, extending from the bottom wall to the heated surface, the layback surface forming a second angle (β) with the bottom wall and a third angle (Δ) with the heated surface; wherein for any range of angle values (α):

$$(\alpha\text{low} < \alpha < \alpha\text{hi})$$

If $\alpha\text{hi} + \alpha\text{low} < \theta$, then $\alpha\text{low} < \Delta < \alpha\text{hi}$;

and

If $\alpha\text{hi} + \alpha\text{low} > \theta$, then $\alpha\text{low} < \beta < \alpha\text{hi}$.

The component of any preceding clause wherein the range of angle values is $12° < \alpha < 16°$.

The component of any preceding clause wherein the range of angle values is $10° < \alpha < 20°$.

The component of any preceding clause wherein the range of angle values is $5° < \alpha < 40°$.

The component of any preceding clause wherein the layback surface intersects the heated surface at a downstream end of the outlet, the top wall intersects the heated surface at an upstream end of the outlet and a straight-line distance measured from the downstream end to the upstream end defines a first dimension of the outlet.

The component of any preceding clause wherein the at least one cooling hole is multiple cooling holes with each having first dimensions within 5% of each other.

The component of any preceding clause wherein the second angle (β) and the third angle (Δ) have an interdependent relationship.

The component of any preceding clause wherein as the first angle (θ) increases to a switch value (θs), one of the second angle (β) or the third angle (Δ) increases at a first rate while the other of the second angle (β) or the third angle (Δ) remains constant.

The component of any preceding clause wherein as the first angle (θ) increases above the switch value (θs), the other of the second angle (β) and the third angle (Δ) increases at the first rate while the other of the second angle (β) and the third angle (Δ) remains constant.

The component of any preceding clause located within a turbine engine, comprising an engine core extending along an engine centerline and including a compressor section, a combustor, and a turbine section in axial flow arrangement and defining a flow path; a temperature sensor within the engine and configured to detect an exhaust gas temperature (EGT) within the engine core; a set of nozzles circumferentially arranged in the turbine section and defining a number of nozzles (NN); and a set of blades circumferentially arranged in the turbine section adjacent to, and downstream of, the set of nozzles, the set of blades defining a number of blades (NB); wherein a blade in the set of blades comprises an outer wall bounding an interior and having an exterior surface, with the outer wall defining a pressure side and a suction side and extending between a leading edge and a trailing edge to define a chord-wise direction, and also extending between a tip and a root to define a span-wise direction; a cooling conduit within the interior; a tip radius (TR) defined between the engine centerline and the tip under standard day conditions of 15° C. at mean sea level altitude and 101.3 kPa atmospheric pressure; a radial length (R) defined by a span-wise line extending between a first location on the outer wall and a second location on the outer wall, with the first location and the second location having a common chord-wise position; a surface length ($L_{max}$) defined by a contour line along the outer wall between the first location and the second location at the common chord-wise position; and a blade parameter (BP) defined as a ratio of the surface length to the radial length (BP=$L_{max}$/R); wherein the exhaust gas temperature EGT, the number of blades NB, the number of nozzles NN, the tip radius TR, and the blade parameter BP define a blade tip durability factor (BTDF) by the following expression BTDF=(TR/EGT)× (NB/NN)×BP; wherein the blade tip durability factor BTDF is between 0.020 and 0.033 in/° C., and the blade parameter BP is between 1-1.234.

A blade for a turbine engine which generates a hot gas fluid flow, and provides a cooling fluid flow, comprising a wall separating the hot gas fluid flow from the cooling fluid flow and having a heated surface along which the hot gas fluid flow flows and a cooled surface facing the cooling fluid flow; and a plurality of cooling holes each comprising a passage extending between an inlet at the cooled surface and an outlet at the heated surface, the outlet extending between an upstream end and a downstream end with respect to the hot gas fluid flow to define a straight-line distance, the passage defining a centerline forming a first angle (θ) with the heated surface; wherein the distances for each of the plurality of cooling holes is maintained within 5% of each other as the first angle (θ) increases regardless of the location of the cooling hole on the blade.

The blade of any preceding clause wherein the passage further comprises a top wall and a bottom wall each extending from the inlet toward the outlet, and a layback surface defining at least a portion of the outlet, extending from the bottom wall to the heated surface, the layback surface forming a second angle (β) with the bottom wall and a third angle (Δ) with the heated surface, wherein for any range of angle values (α):

$$(\alpha\text{low} < \alpha < \alpha\text{hi})$$

If $\alpha\text{hi} + \alpha\text{low} < \theta$, then $\alpha\text{low} < \Delta < \alpha\text{hi}$;

and

If $\alpha\text{hi} + \alpha\text{low} > \theta$, then $\alpha\text{low} < \beta < \alpha\text{hi}$;

The blade of any preceding clause wherein the range of angle values is $12° < \alpha < 16°$.

The blade of any preceding clause wherein the range of angle values is $10° < \alpha < 20°$.

The blade of any preceding clause wherein the range of angle values is $5° < \alpha < 40°$.

The blade of any preceding clause wherein as the first angle (θ) increases to a switch value (θs) one of the second angle (β) and the third angle (Δ) increases at a first rate while the other of the second angle (β) and the third angle (Δ) remains constant.

The blade of any preceding clause wherein as the first angle (θ) increases above the switch value (θs) the other of the second angle (β) and the third angle (Δ) increases at the first rate while the other of the second angle (β) and the third angle (Δ) remains constant.

The blade of any preceding clause wherein the layback surface intersects the bottom wall at a junction and a length (L_β) measured along the first angle (θ) from the junction to the straight-line distance increases when the second angle (β) increases.

The blade of any preceding clause wherein the passage further defines a hydraulic diameter (Dh) and for any constant distance (dconst), first, second, and third angles satisfy the following expression:

$$d_{const} = (D_h/\sin\theta) + ((L_\beta \cdot \sin\beta)/\sin\Delta)$$

The blade of any preceding clause wherein the plurality of cooling holes is three or more cooling holes.

The invention claimed is:

1. A component for a turbine engine which generates a hot gas fluid flow, and provides a cooling fluid flow, comprising:
a wall separating the hot gas fluid flow from the cooling fluid flow and having a heated surface along which the hot gas fluid flow flows and a cooled surface facing the cooling fluid flow; and
at least one cooling hole comprising a passage extending between an inlet at the cooled surface and an outlet at the heated surface, the passage defining a centerline forming a first angle (θ) with the heated surface, the passage having a top wall and a bottom wall each extending from the inlet toward the outlet, and a layback surface defining at least a portion of the outlet, extending from the bottom wall to the heated surface, the layback surface forming a second angle (β) with the bottom wall and a third angle (Δ) with the heated surface;
wherein for any range of angle values (α):

$$(\alpha_{low} \le \alpha \le \alpha_{hi}):$$

If $\alpha hi + \alpha_{low} \le \theta$, then $\alpha_{low} \le \Delta \le \alpha_{hi}$;

and

If $\alpha hi + \alpha_{low} \ge \theta$, then $\alpha_{low} \le \beta \le \alpha_{hi}$.

wherein the sum of the low and high angle values is equal to a switch value (θ_s):

$$\alpha_{hi} + \alpha_{low} = \theta_s.$$

2. The component of claim 1, wherein the range of angle values is 5°≤α≤40°.

3. The component of claim 1, wherein a low second angle (β_low) is greater than a low third angle (Δ_low):

$$\beta_{low} > \Delta_{low}.$$

4. The component of claim 1, wherein a high second angle (β_hi) is greater than a high third angle (Δ_hi):

$$\beta_{hi} > \Delta_{hi}.$$

5. The component of claim 1, wherein as the first angle (θ) increases to the switch value (θ_s), one of the second angle (β) or the third angle (Δ) increases at a first rate while the other of the second angle (β) or the third angle (Δ) remains constant within a range.

6. The component of claim 5, wherein as the first angle (θ) increases above the switch value (θ_s), the other of the second angle (β) and the third angle (Δ) increases at the first rate while the other of the second angle (β) and the third angle (Δ) remains constant within a range.

7. The component of claim 1, wherein the layback surface intersects the heated surface at a downstream end of the outlet, the top wall intersects the heated surface at an upstream end of the outlet and a straight-line distance measured from the downstream end to the upstream end defines a first dimension of the outlet.

8. The component of claim 7, wherein the at least one cooling hole includes multiple cooling holes with each cooling hole having first dimensions within 5% of each other cooling hole.

9. The component of claim 8, wherein the layback surface intersects the bottom wall at a junction and a length (L_β) measured along the first angle (θ) from the junction to the straight-line distance increases when the second angle (β) increases.

10. The component of claim 9, wherein the passage further defines a hydraulic diameter (D_h) and for any constant distance (d_const), first, second, and third angles satisfy the following expression:

$$d_{const} = \frac{D_h}{\sin\theta} + \frac{L_\beta \cdot \sin\beta}{\sin\Delta}.$$

11. The component of claim 1, wherein the second angle (β) and the third angle (Δ) have an interdependent relationship.

12. The component of claim 1 located within a turbine engine, comprising:
an engine core extending along an engine centerline and including a compressor section, a combustor, and a turbine section in axial flow arrangement and defining a flow path;
a temperature sensor within the engine core and configured to detect an exhaust gas temperature (EGT) within the engine core;
a set of nozzles circumferentially arranged in the turbine section and defining a number of nozzles (NN); and
a set of blades circumferentially arranged in the turbine section adjacent to, and downstream of, the set of nozzles, the set of blades defining a number of blades (NB);
wherein a blade in the set of blades comprises:
an outer wall bounding an interior and having an exterior surface, with the outer wall defining a pressure side and a suction side and extending between a leading edge and a trailing edge to define a chord-wise direction, and also extending between a tip and a root to define a span-wise direction;

a cooling conduit within the interior;

a tip radius (TR) defined between the engine centerline and the tip under standard day conditions of 15° C. at mean sea level altitude and 101.3 kPa atmospheric pressure;

a radial length (R) defined by a span-wise line extending between a first location on the outer wall and a second location on the outer wall, with the first location and the second location having a common chord-wise position;

a surface length ($L_{max}$) defined by a contour line along the outer wall between the first location and the second location at the common chord-wise position; and a blade parameter (BP) defined as a ratio of the surface length to the radial length (BP=$L_{max}$/R wherein the exhaust gas temperature EGT, the number of blades NB, the number of nozzles NN, the tip radius TR, and the blade parameter BP define a blade tip durability factor (BTDF) by the following expression:

$$BTDF = \left(\frac{TR}{EGT}\right) \times \left(\frac{NB}{NN}\right) \times BP;$$

wherein the blade tip durability factor BTDF is between 0.020 and 0.033 in/° C., and the blade parameter BP is between 1-1.234.

13. A blade for a turbine engine which generates a hot gas fluid flow, and provides a cooling fluid flow, comprising:

a wall separating the hot gas fluid flow from the cooling fluid flow and having a heated surface along which the hot gas fluid flow flows and a cooled surface facing the cooling fluid flow; and a plurality of cooling holes each comprising a passage extending between an inlet at the cooled surface and an outlet at the heated surface, the outlet extending between an upstream end and a downstream end with respect to the hot gas fluid flow to define a straight-line distance, the passage defining a centerline forming a first angle ($\theta$) with the heated surface, a top wall, and a bottom wall each extending from the inlet toward the outlet, and a layback surface defining at least a portion of the outlet, extending from the bottom wall to the heated surface, the layback surface forming a second angle ($\beta$) with the bottom wall and a third angle ($\Delta$) with the heated surface, wherein for any range of angle values ($\alpha$):

($\alpha_{low} < \alpha < \alpha_{hi}$):

for at least a first cooling hole of the plurality of cooling holes $\alpha_{hi}+\alpha_{low}<\theta$, and $\alpha_{low}<\Delta<\alpha_{hi}$; and for at least a second cooling hole of the plurality of cooling holes $\alpha_{hi}+\alpha_{low}>\theta$, and $\alpha_{low}<\beta<\alpha_{hi}$;

wherein the distances for each of the plurality of cooling holes is maintained within 5% of each other as the first angle ($\theta$) increases regardless of the location of the cooling hole on the blade, and wherein the sum of the low and high angle values is equal to a switch value ($\theta_s$), $\alpha_{hi}+\alpha_{low}=\theta_s$.

14. The blade of claim 13, wherein the range of angle values is 5°<$\alpha$<40°.

15. The blade of claim 13, wherein the plurality of cooling holes are located along a region of the blade with high curvature.

16. The blade of claim 13 wherein for each of the plurality of cooling holes as the first angle ($\theta$) increases to the switch value ($\theta_s$) one of the second angle ($\beta$) and the third angle ($\Delta$) increases at a first rate while the other of the second angle ($\beta$) and the third angle ($\Delta$) remains constant within a range.

17. The blade of claim 16 wherein for each of the plurality of cooling holes as the first angle ($\theta$) increases above the switch value ($\theta_s$) the other of the second angle ($\beta$) and the third angle ($\Delta$) increases at the first rate while the other of the second angle ($\beta$) and the third angle ($\Delta$) remains constant within a range.

18. The blade of claim 12 wherein the layback surface intersects the bottom wall at a junction and a length ($L_\beta$) measured along the first angle ($\theta$) from the junction to the straight-line distance increases when the second angle ($\beta$) increases.

19. The blade of claim 18 wherein the passage further defines a hydraulic diameter ($D_h$) and for any constant distance ($d_{const}$), first, second, and third angles satisfy the following expression:

$$d_{const} = \frac{D_h}{\sin\theta} + \frac{L_\beta \cdot \sin\beta}{\sin\Delta}.$$

20. The component of claim 13, wherein a low second angle ($\beta_{low}$) is greater than a low third angle ($\Delta_{low}$): $\beta_{low}>\Delta_{low}$ or wherein a high second angle ($\beta_{hi}$) is greater than a high third angle ($\Delta_{hi}$)

$$\beta_{hi} > \Delta_{hi}.$$

* * * * *